(12) United States Patent
Palozzi

(10) Patent No.: US 7,883,677 B2
(45) Date of Patent: Feb. 8, 2011

(54) DEER LURE

(76) Inventor: Gary A. Palozzi, 54 Thatcher Rd., Rochester, NY (US) 14617

( * ) Notice: Subject to any disclaimer, the term of this patent is extended or adjusted under 35 U.S.C. 154(b) by 697 days.

(21) Appl. No.: 11/904,011

(22) Filed: Sep. 25, 2007

(65) Prior Publication Data

US 2008/0083150 A1 Apr. 10, 2008

Related U.S. Application Data

(60) Provisional application No. 60/826,983, filed on Sep. 26, 2006.

(51) Int. Cl.
*A62B 7/08* (2006.01)
*A61L 9/00* (2006.01)
*A61L 9/04* (2006.01)
*F24C 1/00* (2006.01)
*F24C 5/04* (2006.01)
*A24F 25/00* (2006.01)
*A01M 13/00* (2006.01)

(52) U.S. Cl. ............... 422/306; 422/1; 422/126; 422/305; 126/248; 126/252; 126/255; 239/6; 239/59; 239/55; 43/1; 43/124; 43/125

(58) Field of Classification Search ............ 422/1, 422/126, 305, 306; 126/248, 252, 255; 239/6, 239/59, 55; 43/1, 124, 125
See application file for complete search history.

(56) References Cited

U.S. PATENT DOCUMENTS 6,503,459 B1 * 1/2003 Leonard et al. ............ 422/125

* cited by examiner

*Primary Examiner*—Jill Warden
*Assistant Examiner*—Monzer R. Chorbaji
(74) *Attorney, Agent, or Firm*—Steven R. Scott

(57) ABSTRACT

This deer lure with scent dispenser has an outer casing with an interior plenum, a lower end and an upper end, with air inlet holes adjacent the lower end, a base adapted to fit into the lower end and extend into the plenum, and a scent dispenser assembly with a reservoir adapted to fit into the upper end with its exterior extending into the plenum. The base is adapted to serve as a pedestal for a candle and to hold the candle above the air inlet holes. The base also allows air for the candle to enter the plenum from the air inlet holes and reach a flame of the candle. The reservoir has an interior in communication with air exterior to the casing for holding a volatile scented liquid, and the invention allows hot gases produced by the candle to escape from the plenum into air exterior to the plenum around and/or through the reservoir, volatilizing the scented liquid in the reservoir. The aforesaid elements may be packed into the interior plenum and caps are provided to cap both ends so as to form a compact easily portable carrying configuration.

19 Claims, 4 Drawing Sheets

DEER LURE

REFERENCE TO RELATED APPLICATIONS

This application claims an invention which was disclosed in Provisional Application No. 60/826,983, filed 26 Sep. 2006, entitled "Deer Lure". The benefit under 35 USC Section 119(e) of this United States Provisional Application is hereby claimed, and the aforementioned application is hereby incorporated herein by reference.

BACKGROUND OF THE INVENTION

1. Field of the Invention

The invention pertains to the field of scent dispersion mechanisms for animal control and/or attraction. More particularly, the invention pertains to a portable and convenient form of scent dispersion unit for use as a deer lure.

2. Description of Related Art

Aromatic materials have a long history of use as animal lures. In recent times, deer hunters have often had recourse to the use of urine scents. For example, the urine of a doe in heat is often used to attract bucks to the location where the hunter is located. Mechanisms and devices for the effective dispersion of such scents are numerous and include various types of passive dispersion systems as well as more active dispersion systems relying on heating and/or evaporation of the liquid scent. Representative examples of the latter are provided by the following U.S. Patents:

- U.S. Pat. No. 4,771,563 issued to Easley for an "Environment Enhancement Device for Animal Scent used by Hunter."
- U.S. Pat. No. 4,937,431 issued to Jameson et al. for an "Apparatus for Distributing a Heated Scent."
- U.S. Pat. No. 5,359,801 issued to Mattucci et al. for a "Scent Dispenser."
- U.S. Pat. No. 5,429,271 issued to Porter for a "Game Scent Dispenser with Scent Warmer."
- U.S. Pat. No. 5,744,106 issued to Eagle for a "Heated Scent Dispenser."
- U.S. Pat. No. 6,038,805 issued to Smidtke for a "Scent Steamer."

However, none of these patents fulfills the need for an active dispersion system relying on heating and/or evaporation of the liquid scent that is compact, convenient, efficient, easy to use, and includes anchoring means for holding it in position for its intended purposes.

SUMMARY OF THE INVENTION

My scent dispenser has, in its basic embodiments: (a) an outer casing having an interior plenum, a lower end and an upper end, with at least one air inlet hole adjacent the lower end; (b) a base adapted to fit into said lower end and extend into said plenum, which base is adapted to serve as a pedestal for a candle and to hold said candle above said air inlet holes, and which base allows air for a candle to enter said plenum from said at least one air inlet hole and reach a flame of said candle; and (c) a scent dispenser assembly with a reservoir adapted to fit into said upper end with its exterior extending into said plenum, which reservoir has an interior in communication with air exterior to the casing for holding a volatile scented liquid, and which scent dispenser assembly allows hot gases produced by said candle to escape from said plenum into air exterior to said plenum around said reservoir exterior.

In its preferred embodiments it may also include an anchoring means in the form of a spike that can be driven into the ground to hold the assembly in operative position, said scent dispenser assembly may further include a lid with apertures for scent dispersion, said reservoir can have air inlets around its upper periphery and a rim blocking direct egress of exhaust gases from the plenum such that said gases are forced to exit by and through the interior of the reservoir, said scent dispenser assembly may further have a central stack that passes into (but not through) said reservoir, and said outer casing may also feature gas egress holes at its upper end (generally adjacent the reservoir). In addition to the foregoing features, the disparate elements of all of the embodiments of the invention may be packed into the interior plenum and caps are provided to cap both ends so as to form a compact easily portable carrying configuration.

DETAILED DESCRIPTION OF THE INVENTION

Figure 1:
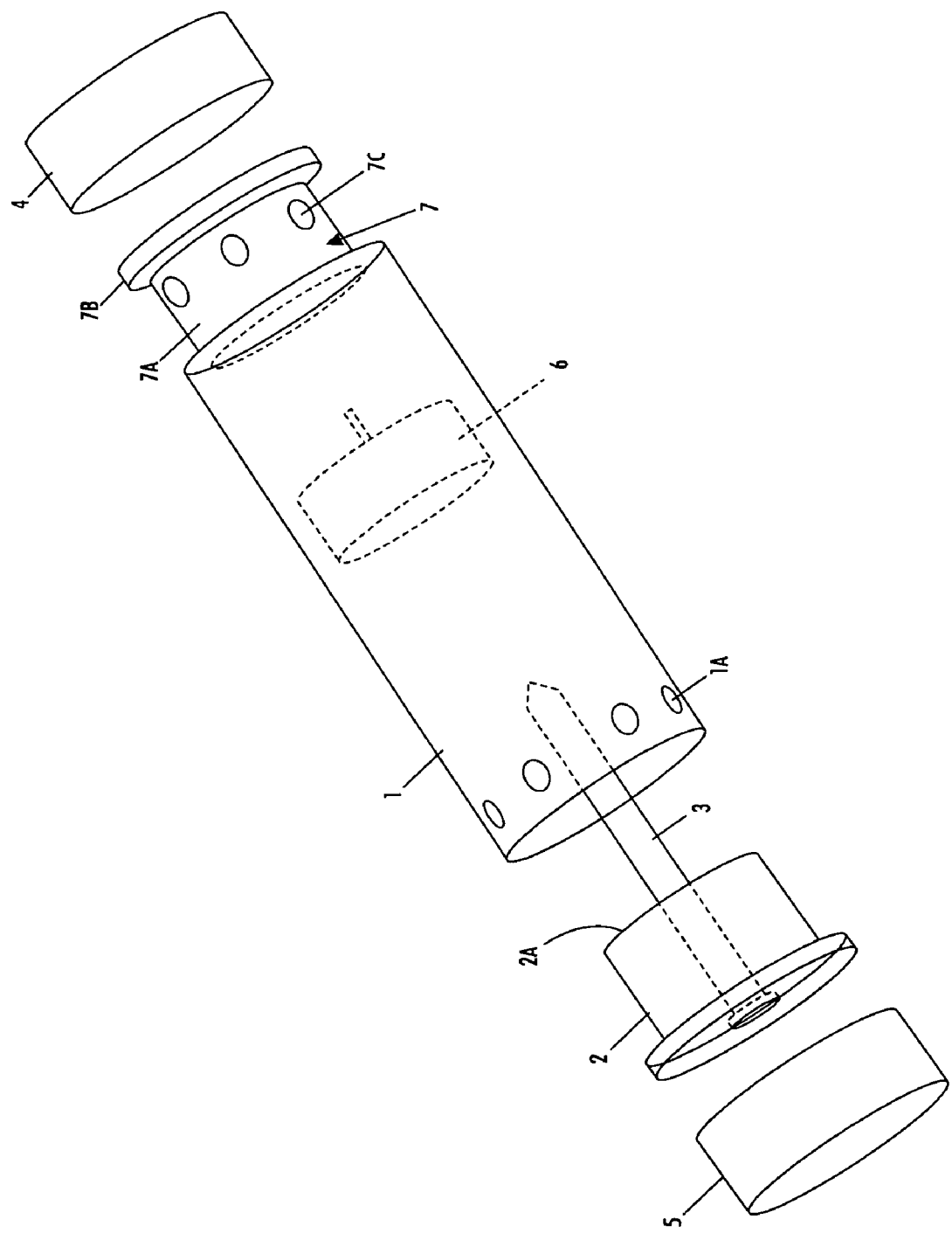
FIG. 1 provides a partially exploded perspective view of a preferred embodiment of the invention.

As can be seen from the drawing figures, my invention is a portable, self-contained deer lure with parts that are easy to assemble for use and are also capable of being packed into a small and easily carried configuration. It includes an external casing 1 with air inlet holes 1A. It also has a base 2, an anchor such as stabilizing spike 3, a top cap 4, a bottom cap 5, and a scent dispenser assembly 7. (See, e.g., FIG. 1).

Figure 2:
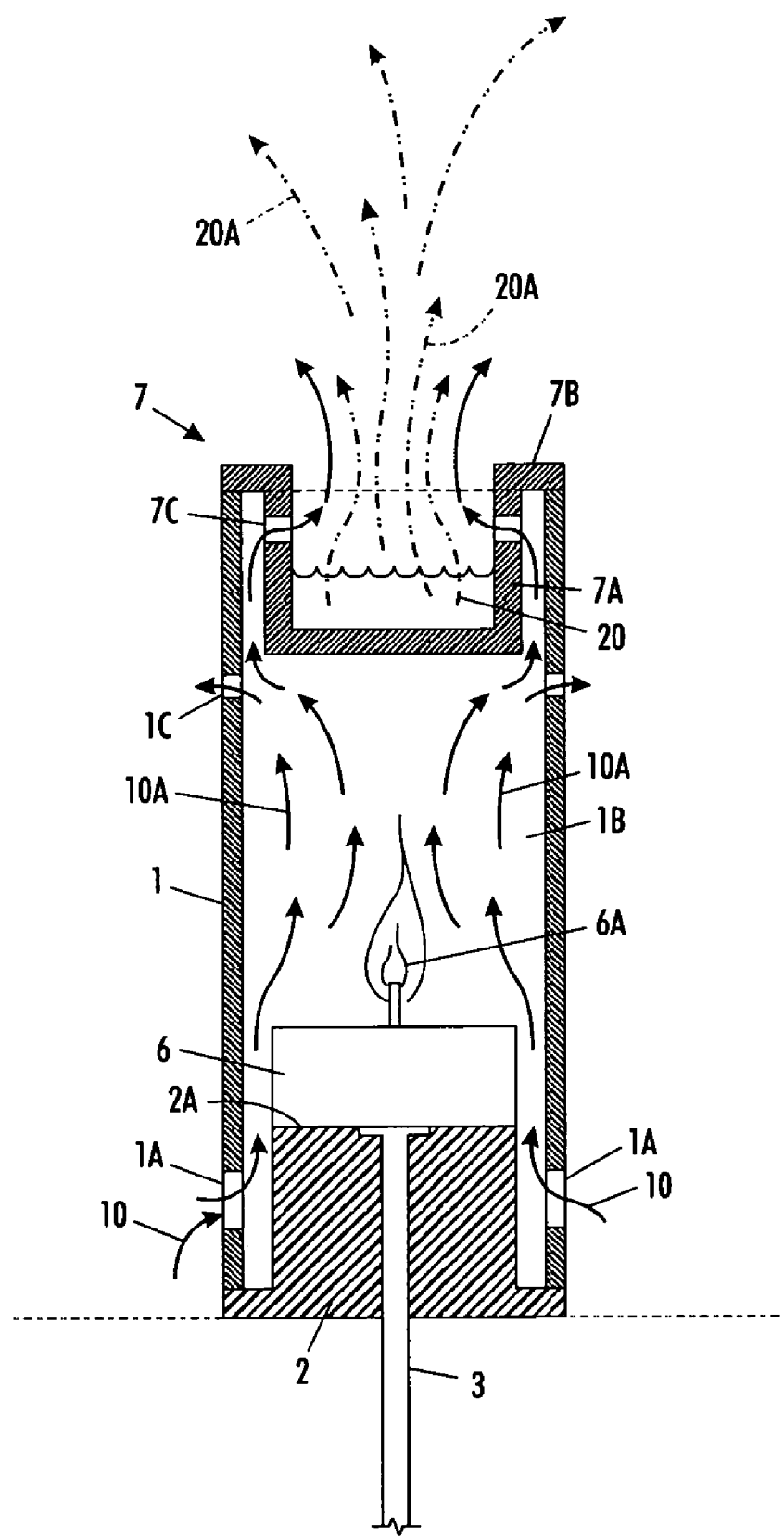
FIG. 2 provides a cross-sectional view of the embodiment illustrated in FIG. 1 in its assembled and operative position and configuration.
Figure 3:
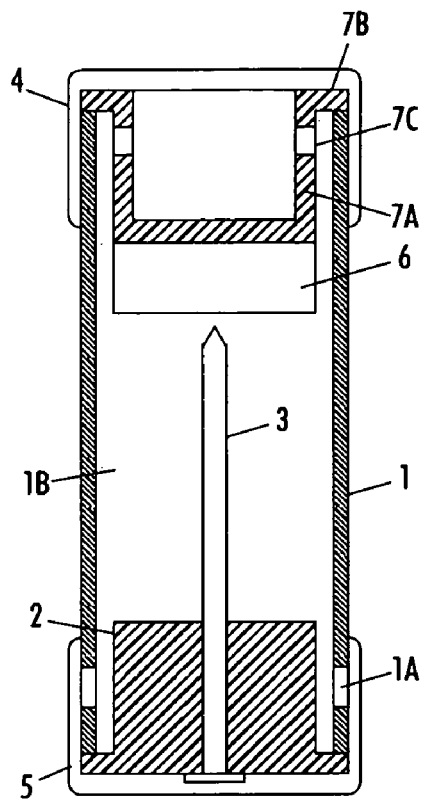
FIG. 3 provides a cross-sectional view of the embodiment illustrated in FIG. 1 in its compact disassembled carrying and storage configuration.

Its convenience and ease of use can best be appreciated by review of the two cross-sectional views of the preferred embodiment given in FIGS. 2 and 3. As illustrated in FIG. 2, showing the invention in its assembled, ready-to-use configuration, its base 2 has an upper surface 2A that serves as a candle-rest for candle 6. Candle 6 is preferably a "tea candle"—these are small candles in light weight aluminum cases that contain melting candle wax and are ideal for the purposes of the invention. Base 2 in the embodiments illustrated does not span casing 1, but provides space for air from air holes 1A in casing 1 to circulate upward past base 2 (as shown by the arrows 10 in FIG. 3) to provide oxygen for the burning of candle 6 in the interior (or plenum 1B) of casing 1. This arrangement, which places the air holes 1A below candle 6 is important as it creates an updraft of air flowing by (and being heated by) candle flame 6A, but does not allow air gusts from holes 1A to directly impact and perhaps put out candle flame 6A. The heated air and gases (exhaust gases 10A) produced by flame 6A flow upward past and around scent dispenser assembly 7 in the basic preferred embodiment illustrated in FIGS. 1 through 3, which has a reservoir 7A for filling with a deer attracting scent agent 20, and a rim 7B that rests on the top of casing 1. The reservoir 7A does not block the egress of exhaust gases 10A despite the presence of rim 7B blocking direct egress from casing 1. Instead of exiting directly, exhaust gases 10A flow around reservoir 7A, into its interior via reservoir inlets 7C, and out through the top of reservoir 7A, heating and volatilizing the deer attracting scent 20 in the process (as illustrated by the broken arrows 20A). In this embodiment especially, gas egress holes 1C can be advantageously placed around the upper end of casing 1 (preferably below the level of reservoir 7A, as illustrated in FIG. 2) and have been found to be beneficial in assuring a steady draft of air past candle 6 via air holes 1A as well as preventing an over pressure or exhaust gas back-up that could, at least potentially, extinguish candle 6.

To use the invention, the caps 4 and 5 (which are preferably formed from a flexible plastic allowing them to snugly grip the exterior of casing 1) are pulled off of the ends of casing 1, and the interior contents disgorged. The spike 3, which is positioned as shown in FIGS. 1 and 3 when in packed position, is then reversed and inserted through base 2 from the opposite direction. It can then be driven down into the ground by foot, hammer, or other available implement, firmly anchoring base 2 in position. Candle 6 can then be lighted and casing 1 dropped into position over base 2 and candle 6. If not already in position, scent dispenser assembly 7 is placed into the top of hollow cylindrical casing 1 (which can advantageously be formed from aluminum). Liquid scent (preferably diluted with water—which I have found to improve the operation of the invention) is then added to reservoir 7A, and the invention is allowed to operate with further additions of liquid scent/water as necessary or deemed advisable. Rain and snow do not affect the operation of the invention as they merely enter reservoir 7A and, even in the embodiments discussed below where direct entry into the casing 1 might be possible, are blocked from impacting candle flame 6A and merely run down the interior walls of casing 1 to exit via the juncture between base 2 and casing 1 and/or air inlets 1A (both of which are well below candle 6). In terms of size and construction, I have found that an approximately 8 inch hollow tube of aluminum or some other durable material with an approximately 2 inch outer diameter is ideal for the casing 1 of my invention, and that 6-8 air inlet holes 1A with a diameter of approximately 9/64" and 6-8 gas egress holes 1C of approximately 5/32" work well in and with this configuration.

Figure 4:
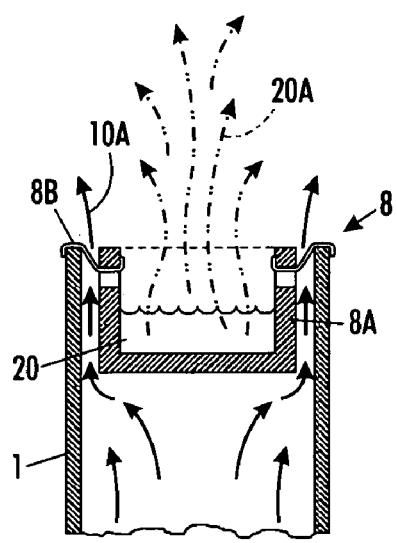
FIG. 4 provides a cross-sectional view of the upper end of a second preferred embodiment of the scent dispersion assembly of the invention.
Figure 5:
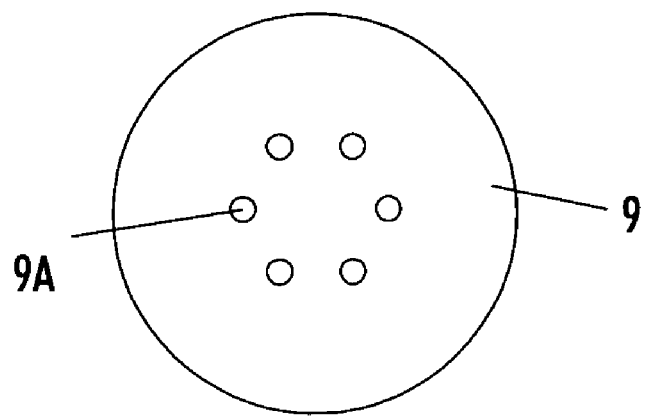
FIG. 5 provides a view from above of a lid for use with the various embodiments of the invention.
Figure 6:
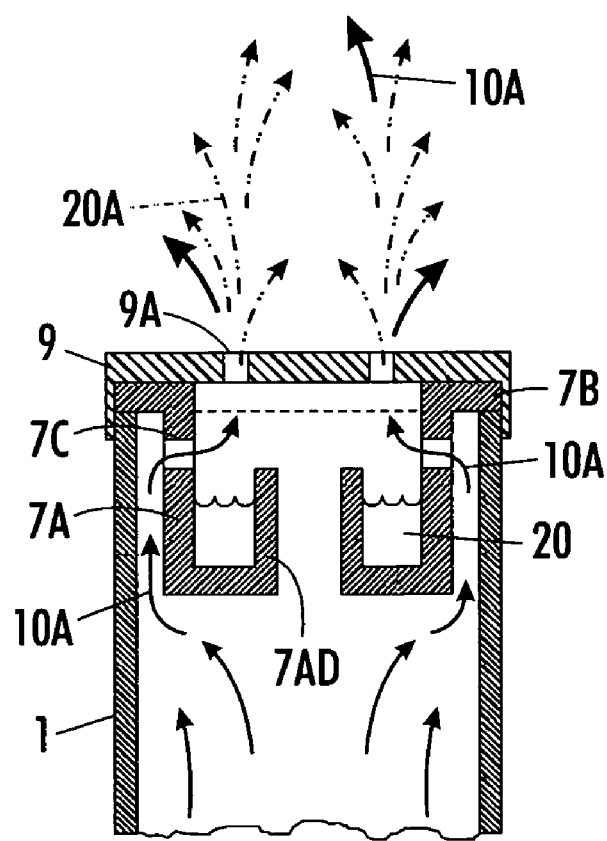
FIG. 6 provides a cross-sectional view of the upper end of a third preferred embodiment of the scent dispersion assembly of the invention.

Additional variations are illustrated in FIGS. 4 through 6. In a first variation, a modified scent dispenser assembly 8 has a reservoir 8A provided with hooks 8B or some other means for attaching it to the top of casing 1 (instead of a rim), allowing heated exhaust gases 10A to circulate directly under and around the exterior of reservoir 8A, and then to exit directly from casing 1 instead of being forced through the interior of reservoir 8A. (See, FIG. 4). This variation is somewhat less efficient in volatilizing deer attracting scent 20, but is also comprehended within the inventive concept. A second variation adds a lid 9 with holes 9A over the top of scent dispenser assembly 7, forcing further circulation of heated air directly over agent 20, and thereby forcing further evaporation and entrainment of evaporated scent in exhaust gases 10A as they escape from the scent dispenser assembly 7. (See, FIGS. 5 and 6). A third variation adds a central vent 7D that passes into, but not through, reservoir 7A. (See, FIG. 6). This variation also serves to improve the heating and volatilization of agent 20. In addition, the spike 3 or other components could easily be mounted to the outside of casing 1 for storage and transport rather than being stored within casing 1 (as illustrated in FIG. 3). This could be done via simple expedients such as, e.g., a holster with loops for spike 3. However, I believe that internal packing of all of the components creates a smoother more trouble-free configuration and is definitely to be preferred.

However, numerous other variations are possible. Accordingly, it is to be understood that the embodiments of the invention herein described are merely illustrative of the application of the principles of the invention. Reference herein to details of the illustrated embodiments is not intended to limit the scope of the claims which follow hereafter, which themselves recite those features regarded as essential to the invention.

I claim:

1. A scent dispersion apparatus, comprising:
   a) a base for holding a candle in spaced relationship above a ground surface;
   b) a spike for fastening the base to a ground surface;
   c) an outer casing having an interior plenum, a lower end and an upper end, which outer casing can be mounted to said base via its lower end and which outer casing has at least one air inlet opening at its lower end and at least one exhaust outlet at its upper end;
   d) a scent dispenser assembly mountable in the upper end of said outer casing such that heat from said candle, when lighted, will vaporize a volatile scent producing material placed in a reservoir of said scent dispenser assembly; and
   e) wherein said base holds the candle above the at least one air inlet opening when the outer casing is mounted to said base.

2. The scent dispersion apparatus described in claim 1, wherein at least one of the base, the spike, the scent dispenser assembly, and the candle can for convenience, compactness, and ease of carriage be at least one of packed inside of the outer casing, and attached to the outer casing.

3. The scent dispersion apparatus described in claim 2, further comprising end caps for the upper and lower ends of the outer casing, which end caps can be placed over the said ends to hold at least one of the base, the spike, the scent dispenser assembly, and the candle in packed position in the said outer casing for convenience, compactness and ease of carriage.

4. The scent dispersion apparatus as described in claim 2, wherein the spike is placed through an aperture in the base pointed in one direction when positioned to fasten the base to a ground surface and the spike is placed through said aperture in the base pointed in an opposite direction when positioned to be packed inside of the outer casing.

5. The scent dispersion apparatus as described in claim 1, wherein said scent dispenser assembly includes at least one of: a rim for mounting said scent dispenser assembly in the upper end of said outer casing, hooks for mounting said scent dispenser assembly in the upper end of said outer casing, a vent that passes into but not through the reservoir of said scent dispenser assembly, a reservoir with inlets allowing ingress of hot gases from the outer casing, and a lid having holes for placement over the reservoir.

6. The scent dispersion apparatus as described in claim 1, wherein said outer casing is at least one of: a cylindrical tube, a cylindrical tube with open top and bottom ends, provided with air holes in sides proximate its lower end serving as said at least one air inlet opening, and provided with gas egress holes in sides proximate its upper end.

7. A scent dispersion apparatus as described in claim 1, wherein the base, the spike, the scent dispenser assembly, and the candle can for convenience, compactness, and ease of carriage all be packed inside of the outer casing.

8. The scent dispersion apparatus described in claim 7, further comprising end caps for the upper and lower ends of the outer casing, which end caps can be placed over the said ends to hold the base, the spike, the scent dispenser assembly, and the candle in packed position in the said outer casing for convenience, compactness and ease of carriage.

9. The scent dispersion apparatus as described in claim 7, wherein the spike is placed through an aperture in the base pointed in one direction when positioned to fasten the base to a ground surface and the spike is placed through said aperture in the base pointed in an opposite direction when positioned to be packed inside of the outer casing.

10. The scent dispersion apparatus as described in claim 7, wherein said scent dispenser assembly includes at least one of: a rim for mounting said scent dispenser assembly in the upper end of said outer casing, hooks for mounting said scent dispenser assembly in the upper end of said outer casing, a vent that passes into but not through the reservoir of said scent dispenser assembly, a reservoir with inlets allowing ingress of hot gases from the outer casing, and a lid having holes for placement over the reservoir.

11. The scent dispersion apparatus as described in claim 7, wherein said outer casing is at least one of a cylindrical tube, a cylindrical tube with open top and bottom ends, provided with air holes in sides proximate its lower end serving as said at least one air inlet opening, and provided with gas egress holes in sides proximate its upper end.

12. A scent dispersion apparatus as described in claim 1,
wherein at least one of the base, the spike, the scent dispenser assembly, and the candle can for convenience, compactness, and ease of carriage be at least one of packed inside of the outer casing, and attached to the outer casing; and
wherein said outer casing is at least one of a cylindrical tube, a cylindrical tube with open top and bottom ends, provided with air holes in sides proximate its lower end serving as said at least one air inlet opening, and provided with gas egress holes in sides proximate its upper end.

13. The scent dispersion apparatus described in claim 12, further comprising end caps for the upper and lower ends of the outer casing, which end caps can be placed over the said ends to hold at least one of the base, the spike, the scent dispenser assembly, and the candle in packed position in the said outer casing for convenience, compactness and ease of carriage.

14. The scent dispersion apparatus as described in claim 12, wherein the spike is placed through an aperture in the base pointed in one direction when positioned to fasten the base to a ground surface and the spike is placed through said aperture in the base pointed in an opposite direction when positioned to be packed inside of the outer casing.

15. The scent dispersion apparatus as described in claim 12, wherein said scent dispenser assembly includes at least one of: a rim for mounting said scent dispenser assembly in the upper end of said outer casing, hooks for mounting said scent dispenser assembly in the upper end of said outer casing, a vent that passes into but not through the reservoir of said scent dispenser assembly, a reservoir with inlets allowing ingress of hot gases from the outer casing, and a lid having holes for placement over the reservoir.

16. The scent dispersion apparatus described in claim 15, further comprising end caps for the upper and lower ends of the outer casing, which end caps can be placed over the said ends to hold at least one of the base, the spike, the scent dispenser assembly, and the candle in packed position in the said outer casing for convenience, compactness and ease of carriage.

17. The scent dispersion apparatus as described in claim 16, wherein the spike is placed through an aperture in the base pointed in one direction when positioned to fasten the base to a ground surface and the spike is placed through said aperture in the base pointed in an opposite direction when positioned to be packed inside of the outer casing.

18. The scent dispersion apparatus as described in claim 15, wherein the spike is placed through an aperture in the base pointed in one direction when positioned to fasten the base to a ground surface and the spike is placed through said aperture in the base pointed in an opposite direction when positioned to be packed inside of the outer casing.

19. The scent dispersion apparatus described in claim 1, wherein at least one of
the base, the spike, the scent dispenser assembly, and the candle can for convenience, compactness, and ease of carriage be packed inside of the outer casing,
the scent dispersion apparatus further comprises end caps for the upper and lower ends of the outer casing, which end caps can be placed over the said ends to hold at least one of the base, the spike, the scent dispenser assembly, and the candle in packed position in the said outer casing for convenience, compactness and ease of carriage,
the spike is placed through an aperture in the base pointed in one direction when positioned to fasten the base to a ground surface and the spike is placed through said aperture in the base pointed in an opposite direction when positioned to be packed inside of the outer casing,
said scent dispenser assembly includes at least one of: a rim for mounting said scent dispenser assembly in the upper end of said outer casing, hooks for mounting said scent dispenser assembly in the upper end of said outer casing, a vent that passes into but not through the reservoir of said scent dispenser assembly, a reservoir with inlets allowing ingress of hot gases from the outer casing, and a lid having holes for placement over the reservoir, and
said outer casing is at least one of: a cylindrical tube, a cylindrical tube with open top and bottom ends, provided with air holes in sides proximate its lower end serving as said at least one air inlet opening, and provided with gas egress holes in sides proximate its upper end.

* * * * *